UNITED STATES PATENT OFFICE.

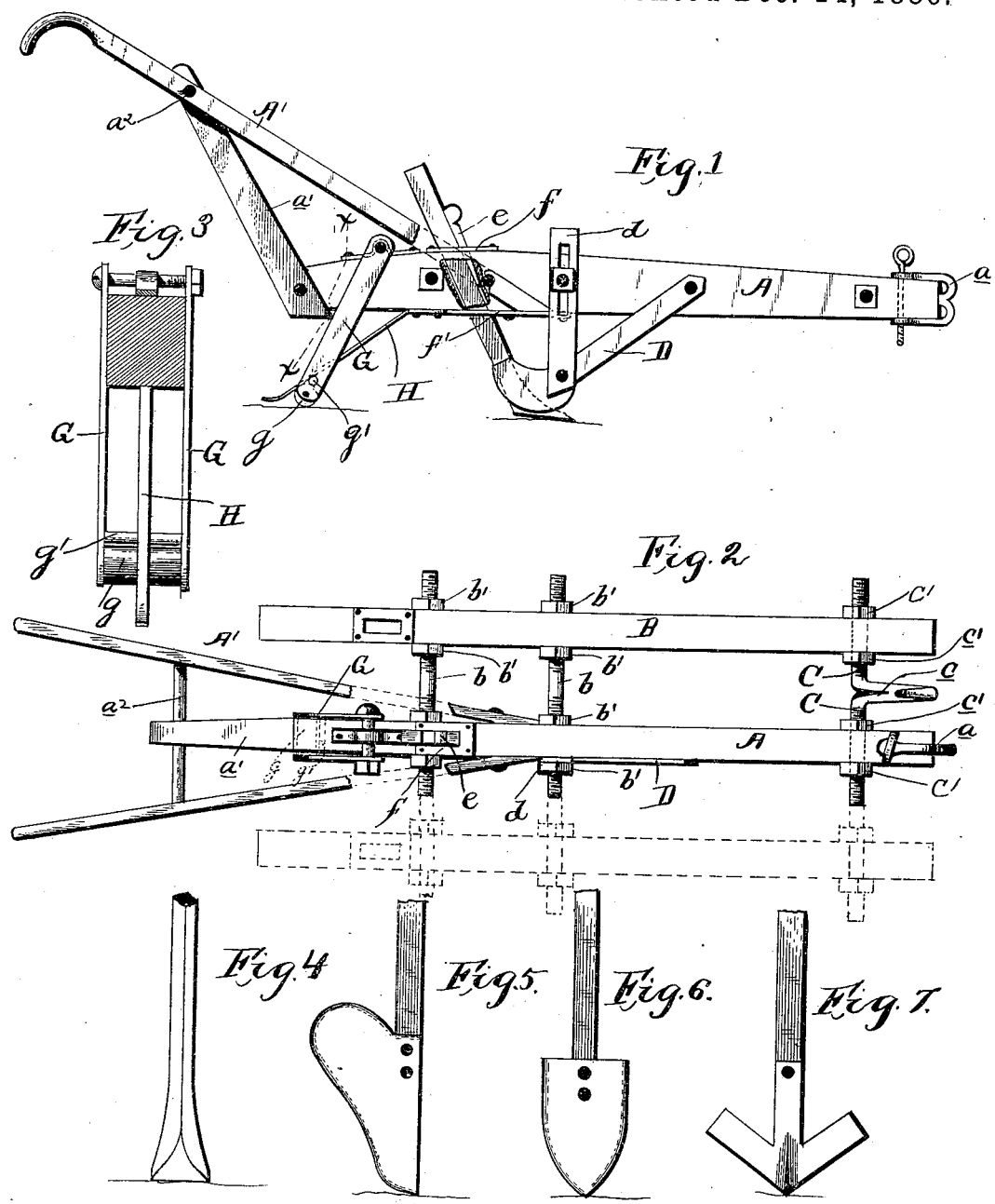

GEORGE W. ANDERSON, OF ERIN, TENNESSEE.

COMBINED PLOW AND CULTIVATOR.

SPECIFICATION forming part of Letters Patent No. 354,082, dated December 14, 1886.

Application filed October 14, 1886. Serial No. 216,245. (No model.)

*To all whom it may concern:*

Be it known that I, GEORGE W. ANDERSON, a citizen of the United States, residing at Erin, in the county of Houston and State of Tennessee, have invented certain new and useful Improvements in a Combined Plow and Cultivator; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to combined cultivators and plows.

The object of the improvement is the construction of a plow, and combining therewith a supplemental plow which can be located on either side, as desired, and connected therewith, so that the implement can be used singly or in combination with the supplemental plow.

The improvement consists in the novel features, more particularly hereinafter set forth, claimed, and shown in the annexed drawings, in which—

Figure 1 is a side view of a plow embodying my improvements. Fig. 2 is a plan view of the same, and Fig. 3 is a rear section of the plow-beam with the hanger and spring. Figs. 4, 5, 6, and 7 are front views of the interchangeable plows and shovels.

The main plow consists of the beam A, provided with the usual clevis, $a$, at its front end, and the handles A' at the rear end, which are braced by the standard $a'$, secured to the end of the beam at its lower end, and to the cross-bar $a^2$ of the handles at its upper end.

The supplemental plow-beam B, which is arranged at a distance from the beam A, is connected therewith by rods $b$ at its rear end and the clevis C at its front end. The rods $b$ are threaded on each end, which ends are passed transversely through the beams, and have nuts $b'$ screwed thereon on each side of the beams, whereby they may be brought closer to or separated farther from each other.

The clevis C has its shank bifurcated, forming arms $c$, which are bent in opposite directions, threaded, and passed through transverse openings in the front ends of the beams, and are provided with adjusting-nuts $c'$, for regulating the distance apart of said ends.

The beam B may be located on either side of the beam A, as occasion may require, and as shown by full and dotted lines in Fig. 2.

When used as a cultivator, the implement will be provided with a fender, D, which will be pivoted at its front end to the beam, and have its rear adjusted vertically by the brace $d$, connected at its lower end with the fender, and having its upper end vertically slotted, through which a bolt passes, preferably one of the threaded rods $b$, to hold it in any adjusted position. Each of the beams are provided with vertical openings to receive a shank or standard of any of the shovels shown in Figs. 3 to 6, inclusive, which is held therein by the wedge $e$. The opening is re-enforced by the plate $f$, secured to the upper side of the beam, and by the plate $f'$, secured to the under side of the beam. A swinging frame, G, pivoted at its upper end to the beam and provided with a roller, $g$, at its lower end, and held down upon the ground by the tension-spring H, serves to support the beam and assist in the management of the plow. The free end of the spring H bears upon a cross-bar, $g'$, located near the end of the swinging frame just above the roller $g$, and in this manner exerts a force upon the roller to hold it close upon the ground.

Having thus described my invention, what I claim, and desire to secure by Letters Patent, is—

1. The combination, with the main and supplemental plow-beams and the adjustable screw-rods, of the clevis uniting the forward ends, having its shank bifurcated and extended in opposite directions and threaded, and the nuts screwed upon said ends, substantially as and for the purpose described.

2. The combination, with the beam and plow, of the swinging frame having a roller journaled between its lower ends and the cross-bar located above the roller, and the tension-spring secured at its upper end to the beam, and having its free end resting upon the cross-bar, substantially as and for the purpose described.

In testimony whereof I affix my signature in presence of two witnesses.

GEORGE W. ANDERSON.

Witnesses:
J. G. HINSON,
J. W. MCDONALD.